L. M. WARD.
AGRICULTURAL MACHINE.
APPLICATION FILED APR. 21, 1914.

1,273,205.

Patented July 23, 1918.

Witnesses

Louis M. Ward, Inventor by Attorneys

UNITED STATES PATENT OFFICE.

LOUIS M. WARD, OF LINCOLN, NEBRASKA.

AGRICULTURAL MACHINE.

1,273,205.  Specification of Letters Patent.  Patented July 23, 1918.

Application filed April 21, 1914. Serial No. 833,478.

*To all whom it may concern:*

Be it known that I, LOUIS M. WARD, a citizen of the United States, residing at Lincoln, in the county of Lancaster and State of Nebraska, have invented a new and useful Agricultural Machine, of which the following is a specification.

The present invention relates to improvements in agricultural machines, one object of the invention, being the provision of a motor driven machine, in which a prime mover, preferably an explosion engine is employed, there being provided two clutch actuated transmissions, one for actuating the tractor wheels and the other for actuating the cutter bar, in a mowing machine or the harvesting mechanism in a harvester, thus permitting both to be operated independently, so that regardless of the speed at which the machine is moving, the speed of the other mechanism may be varied at will, this particular arrangement being a decided advantage over the structure in which the mechanisms are operated from the tractor mechanism.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—

Figure 1:
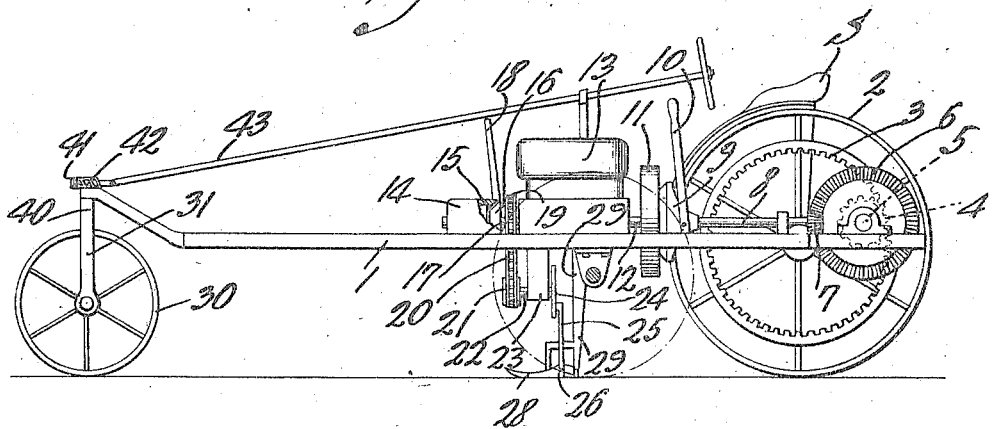
Figure 1 is a side elevation showing the present invention applied to a mowing machine.
Figure 2:
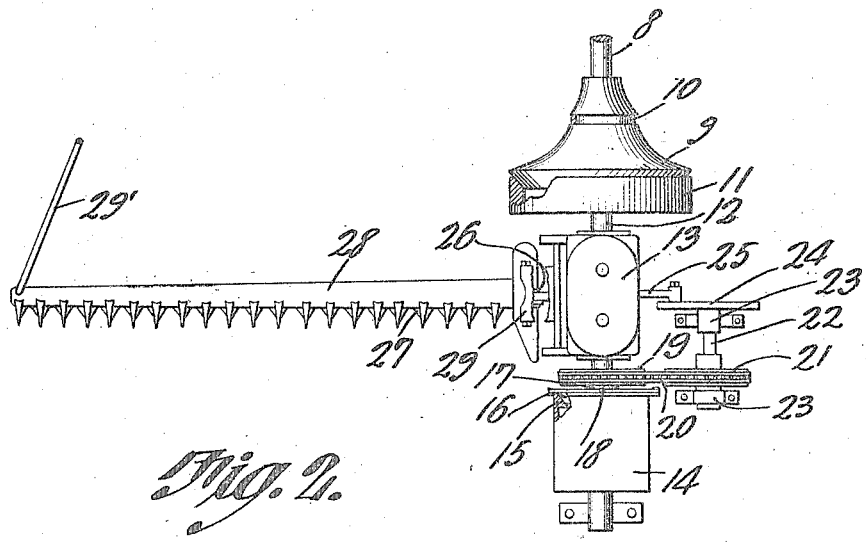
Fig. 2 is a top plan view partly in section showing the prime mover, the two clutches and the means for transmitting motion to the cutter bar.

Referring to the drawings, the numeral 1 designates the frame which is provided with the tractor wheels 2, each one of which has attached thereto, the internal gear 3, which is operated by the pinion 4 carried upon the transverse shaft 5. Upon this transverse shaft 5 is a large bevel pinion 6, which is in mesh at all times with the small bevel pinion 7 carried upon the longitudinally disposed shaft 8. This shaft 8 is provided with a clutch member 9 which is manually controlled through the lever 10 to be placed into and out of engagement with the coacting clutch member and fly wheel 11. This fly wheel is disposed upon the crank shaft 12 of the explosion engine 13. Thus the tractor wheels are operated as desired through the clutch.

A drum 14 is keyed upon and rotates with the shaft 12 at the opposite side of the engine to the fly wheel 11, this drum 14 being provided with a clutch face 15 for coaction with the clutch 16 of the slidable sleeve 17. This sleeve 17 is controlled by means of the manually operated lever 18, so that the clutch member thereof may be placed in engagement with the clutch face 15 of the drum 14 and thus rotate the sprocket 19 and through the chain 20, the sprocket 21. The sprocket 21 is keyed upon the short shaft 22, which is journaled in the brackets 23 between the horizontal planes of the engine and mowing mechanism hereinafter described, while keyed upon one end of the shaft 22 is a disk 24 to which there is eccentrically connected the pitman rod 25 which is connected at 26 to operate the cutter bar 27 of the mowing mechanism 28. This mowing mechanism is properly supported at one end by the bracket 29 and at the opposite end by the rod 29'.

As the movement of the clutch member carriage sprocket 19 is very slight, in practice being approximately one-quarter of an inch, the engine being so set that when the clutch is in engagement, the chain is driving the sprocket in alinement, the throwing out of the clutch although moving the sprocket slightly out of alinement does not affect the chain to any appreciable degree but in fact produces a slight braking effect so that the chain immediately stops.

In order to properly steer the present mechanism so that the operator seated upon the seat S may have under his control, both the steering and actuation of the tractors and mowing mechanism, the wheel 30 is journaled in the fork 31, a stem 40 being mounted in the frame 1 and carrying the worm gear 41 which is controlled by the small worm 42 actuated by the steering staff 43.

From the foregoing description, it is evident that by the manipulation of the handles 10 and 18, the traction of the present apparatus may be readily controlled and that the cutter bar 27 which is indicative of any mechanism controlled by the second clutch will be actuated independently, so that the same may be driven at a time when the apparatus is stationary or nearly so, and when the same is making turns at the end of the field, thus permitting a variable action of the bar during the movement of the machine.

What is claimed is:

An agricultural machine embodying a wheel mounted frame including a rear tractor wheel, an explosion engine mounted on the frame between the ends thereof with its crank shaft disposed longitudinally above the frame, a clutch controlled transmission mechanism connecting the rear end of the crank shaft and tractor wheel, a transverse finger bar projecting to one side of the frame and having its inner end disposed below the engine, a depending bracket carried by the frame and attached to the inner end of said finger bar, a reciprocatory cutter bar carried by the finger bar, a counter shaft disposed between the horizontal planes of the frame and cutter bar at that side of the vertical plane of the crank shaft opposite the finger bar, a depending bracket carried by the frame in which the countershaft is journaled, a sprocket wheel carried by the forward end of the crank shaft, a clutch for connecting said sprocket wheel and shaft, a sprocket wheel carried by the counter shaft, a sprocket chain trained around said sprocket wheels, the rear end of said counter shaft having a crank, and a pitman connecting said crank and the inner end of the cutter bar.

In testimony that I claim the foregoing as my own, I have hereto affixed my signature in the presence of two witnesses.

LOUIS M. WARD.

Witnesses:
 GRACE E. MILLS,
 NINA VAN OSTRAND.